United States Patent
Poulter et al.

(10) Patent No.: US 6,603,741 B1
(45) Date of Patent: Aug. 5, 2003

(54) MONITORING OF CONNECTION BETWEEN NETWORK DEVICES IN A PACKET-BASED COMMUNICATION SYSTEM

(75) Inventors: Alan R Poulter, Elstow (GB); David J Law, Kempston (GB); Paul Cramphorn, Kings Langley (GB); Steven Brewer, Hertford (GB); Patrick M Overs, Caddington (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/373,231

(22) Filed: Aug. 12, 1999

(30) Foreign Application Priority Data

May 8, 1999 (GB) .............................................. 9910582

(51) Int. Cl.[7] ................................................. H04J 3/14
(52) U.S. Cl. ....................... 370/252; 370/445; 370/465; 709/228; 709/237
(58) Field of Search ................................. 370/445, 235, 370/236, 252, 465; 709/228, 233, 237

(56) References Cited

U.S. PATENT DOCUMENTS

| | | | |
|---|---|---|---|
| 4,589,111 A | 5/1986 | Adachi | |
| 5,159,465 A | 10/1992 | Maemura et al. | |
| 5,922,052 A * | 7/1999 | Heaton | 709/223 |
| 6,141,350 A * | 10/2000 | Mahale et al. | 370/438 |
| 6,215,816 B1 * | 4/2001 | Gillespie et al. | 375/219 |
| 6,349,331 B1 * | 2/2002 | Andra et al. | 709/220 |
| 6,359,893 B1 * | 3/2002 | Mills | 370/402 |
| 6,442,174 B1 * | 8/2002 | Lin | 370/466 |

* cited by examiner

Primary Examiner—Min Jung
(74) Attorney, Agent, or Firm—Nixon & Vanderhye, P.C.

(57) ABSTRACT

The invention concerns the establishment of the rate of transmission of data between two network stations by means of auto-negotiation. The execution of an auto-negotiation sequence by a state machine is counted and if the number of executions of the sequence exceeds a threshold, the auto-negotiation sequence is modified to establish a data rate lower than a previously negotiated rate. A particular example is described for use in accordance with IEEE standard 802.3. In a specific example, monitoring of the execution of the auto-negotiation sequence comprises counting the occurrences of a 'page received' bit in an auto-negotiation expansion register.

3 Claims, 2 Drawing Sheets

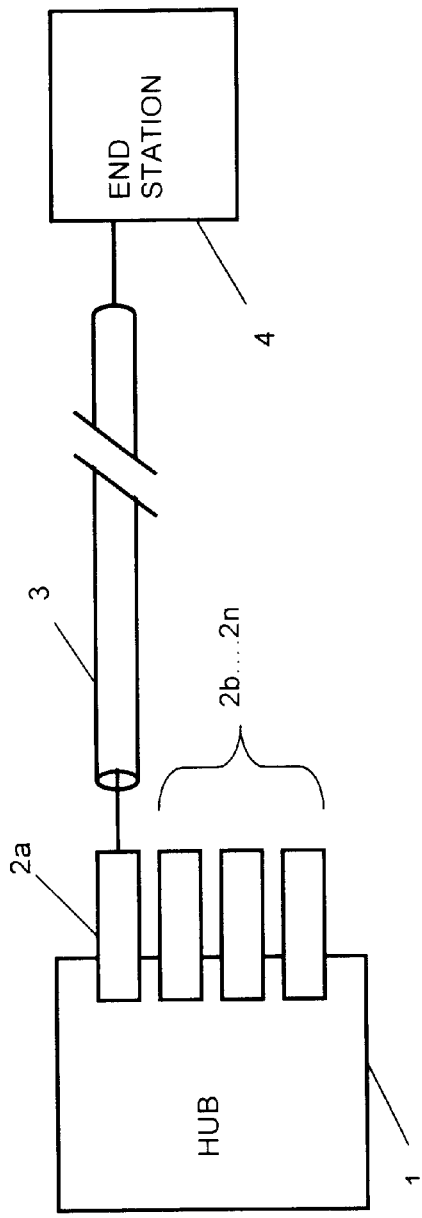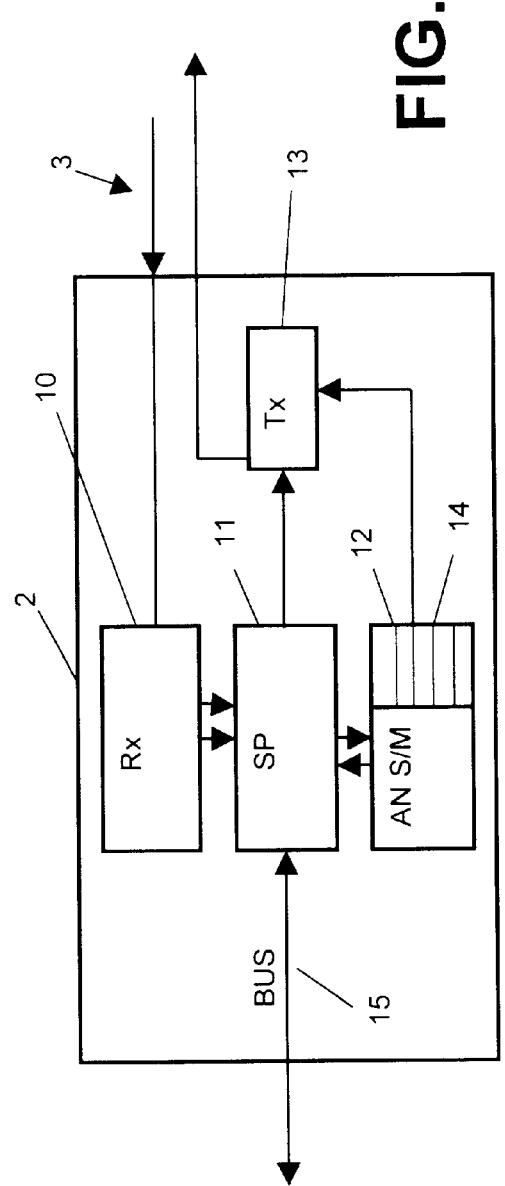

MONITORING OF CONNECTION BETWEEN NETWORK DEVICES IN A PACKET-BASED COMMUNICATION SYSTEM

FIELD OF THE INVENTION

This invention relates to packet-based data communication networks and particularly an Ethernet network or similar network wherein data may be transferred between devices, particularly a hub and another network station such as a personal computer, at at least two different rates, the devices being able to establish a selected data rate by means of auto-negotiation. The invention is particularly though not necessarily exclusively intended for use with an auto-negotiation scheme as defined in IEEE 802.3, 1998 Edition, Clause 28.

BACKGROUND TO THE INVENTION

As switching and other technology has improved, the rate at which data may be transferred between network devices has increased. Currently there are various standards to which successive generations of network devices has been designed to operate. In particular a standard data rate of 10 Megabits per second has been partly supplanted by a standard of 100 Megabits per second and is expected to be supplanted by an even faster rate, 1 Gigabit per second. An increase in standard data rates may be expected in the future.

However, network devices operating according to obsolescent standards, normally at a lower data rate or rates, continue to be used. It therefore follows that it is known for a network hub to be capable of exchanging data with another network station at a plurality of different selectable rates. It is also known, and specified in for example the above mentioned network standard for a hub and a station to which it is connected to commence a 'conversation' by means of a process of auto-negotiation, wherein a device such as a network hub establishes by means of interrogation and response whether the other station is capable of transmitting and receiving data at the higher of two rates or a rate of which is highest of a multiplicity of rates, so that thereafter the devices, such as the hub and the other station, exchange or transmit information from one to the other at the selected higher or highest mutually acceptable rate. Auto-negotiation is fully explained in, for example, IEEE Std 802.3, 1998 Edition, published by the Institute of Electrical and Electronics Engineers, Inc., NY-10017-2394, USA.

It is known to maintain a connection between a hub and another station by means of a continuous sequence of symbols representing an idle state. When one station at either end of the connection wishes to send data then by convention it sends at least a first symbol followed by a second symbol, representing a 'carrier' signal. The data then follows in the format defined by the appropriate standard. At the end of the data packet a third predetermined symbol, followed by a fourth predetermined symbol, is sent so as to represent the end of the carrier. Such a sequence is conventionally repeated for each and every packet transmitted between the stations. Typically, the first and second symbols are a J and K symbol and the third and fourth symbols are a T and R symbol.

In our earlier patent application number 9810810.3, filed May 20, 1998, we describe and claim an improvement which includes the monitoring at one of the stations, namely the hub, the occurrence of an error represented by a symbol other than an idle state immediately followed by an idle state symbol, comparing a rate of occurrence of errors with a threshold and forcing the data connection to proceed at the lower rate if the aforementioned error rate exceeds the threshold.

Such a scheme is effective to monitor the quality of the connection. For example, although the devices which are connected by auto-negotiation may have the ability and the performance appropriate to a higher rate achieved by auto-negotiation, the physical link between them may not be of sufficient quality or may become degraded, so that the reliability and throughput of the connection is insufficient or is reduced. The earlier proposal facilitates the detection, by the monitoring of specific errors of a loss of quality of the connection or insufficient quality and if the error rate representing a parameter of the quality of the cable exceeds some selectable threshold rate, the link may be automatically downgraded to a lower rate selectable by auto-negotiation.

However, a system of that kind, and systems of possibly the same general character, may in a variety of circumstances fail to complete a link between devices properly.

For example, both ends of a link may be capable of higher rate operation yet the physical link may not be capable of supporting the selected higher date rate. For example, in the case of 10BASE-T/100BASE-TX operation, it is possible that certain channel characteristics can cause a situation wherein auto-negotiation can complete, because it uses the robust 10BASE-T link pulse signaling system, and select a highest common denominator of 100 Megabits per second yet the channel is not of sufficient quality for the 100BASE-TX link to be established.

10BASE-T link pulses are more likely to be correctly received due to the higher transmit amplitude level and margin at the receive threshold matching. Such a communications link is more reliable than a 100BASE-TX link. The 100BASE-TX linkOk requires a reliable presence of the received idle symbol stream and on a low quality link this may not be achieved.

When this occurs, the auto-negotiation state will time out as it never sees the required 'link ok' and restarts auto-negotiation. In the particular example, the state machine which controls the auto-negotiation process (shown in FIG. 28–16 of the aforementioned publication) will not execute the transition from the state 'FLP LINK GOOD CHECK' to 'FLP LINK GOOD' but will execute the transition to 'TRANSMIT DISABLE' and thence to 'ABILITY DETECT', recommencing an auto-negotiation sequence. The new sequence of auto-negotiation again results in a selection of the higher rate (100BASE-TX) and owing to the sub-standard link the cycle will repeat continuously. Establishment of a link between the devices will not occur.

Another difficulty that exists arises from the provision of a substandard link with a device which is capable of 'smart auto-sensing' with a high quality receiver, connected to a far end device which has a low quality receiver and is not capable of 'smart' auto sensing. Here a 'high-quality' receiver is meant to refer to a receiver which by virtue of a decision-feedback equalizer or otherwise has a high immunity to inter-symbol interference. Also the qualification 'smart' refers to a device of the general character described in the aforementioned application, that is to say a device which is capable of auto-negotiation, that is to say selection of the higher rate of or highest feasible rate of a multiplicity of possible data rates preferably in accordance with the aforementioned standard and is also capable of monitoring the link for the occurrences of errors, so as to be capable of downgrading the link to a lower of the possible rates in the event of detection of an undue proportion of specific errors. Notwithstanding the robustness of such a scheme, various situations can occur which may defeat the 'smart' device. The link could be established yet the non-smart device with the low quality receiver could be subject to multiple errors whereas the smart device with the high quality receiver would be immune to them. There is now in effect a substandard link that a 'smart' auto sensing scheme would not protect.

In this situation the continuous auto-negotiation would still occur because it would be forced by the device that was unable to establish the link.

SUMMARY OF THE INVENTION

The present invention is based on the detection of occurrences of an auto-negotiation process or cycle. This could be achieved in a variety of ways, depending on the nature of the auto-negotiation. One example is the use of bit 6.1 as defined in clause 28.2.4.1.5 and Table 28-5 of the aforementioned standard, this bit being a 'Page-Received' bit in an auto-negotiation expansion register which is one of the dedicated registers for a state machine controlling the auto-negotiation function. This bit is automatically set to logical '1' to indicate that a new Link Code Word has been received and stored in the auto-negotiation link partner ability register and is automatically set to logical zero when this register is read. Such a bit will therefore be set high each time the auto-negotiation function is executed by a physical layer device and may be used in conjunction with a threshold, defining for example a limit on the permitted number of executions of the auto-negotiation function, to force the auto-negotiation function to advertise a lower acceptable data rate. This modification can readily be included in an existing auto-negotiation algorithm as an additional condition.

Further features of the invention will be apparent from the detailed description of a specific example that follows.

FIG. 1 illustrates schematically a hub connected to an end station.

FIG. 2 is a schematic representation of certain operational features within the hub.

DETAILED DESCRIPTION OF THE PREFERRED EXAMPLE

Figure 3:
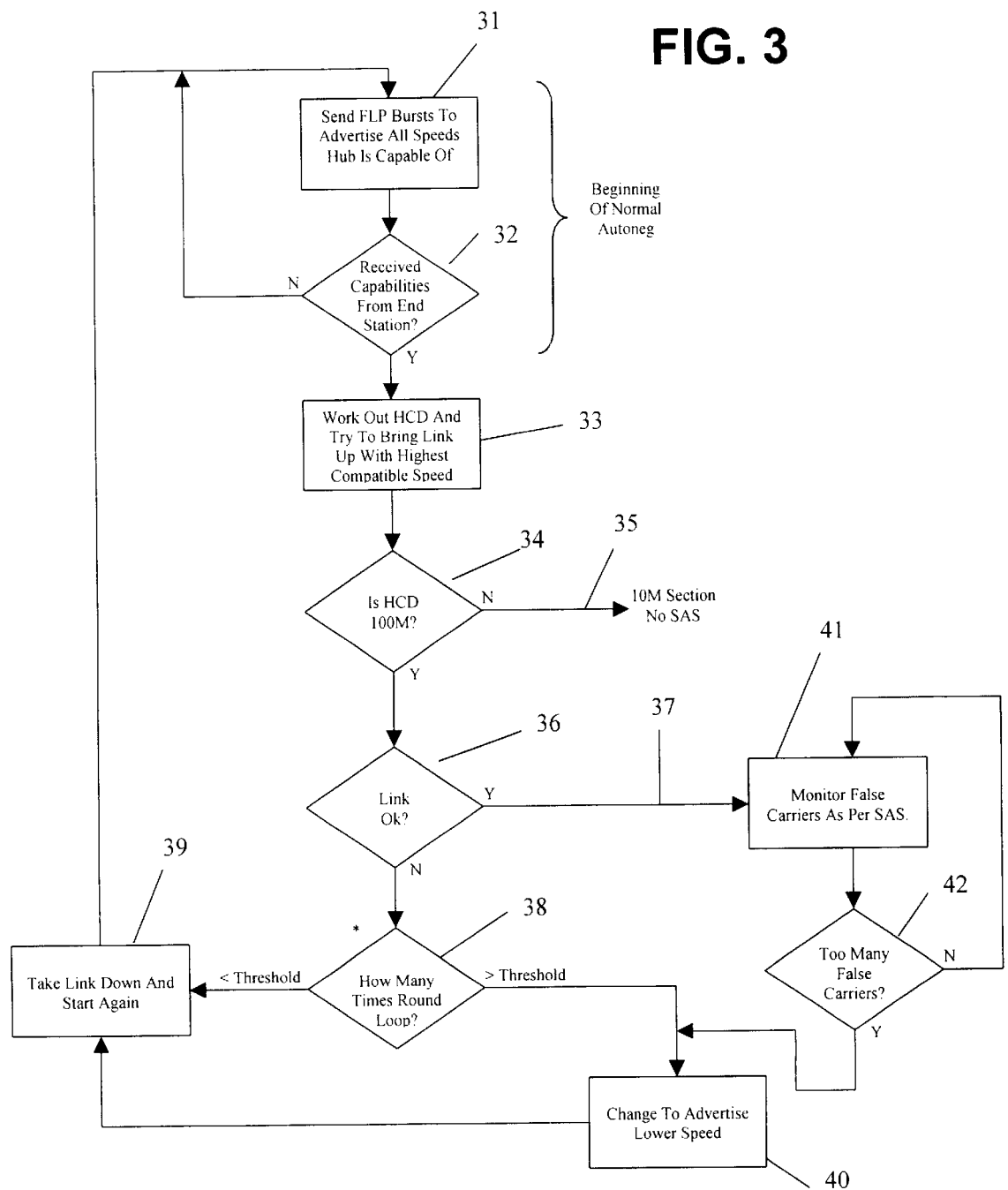
FIG. 3 is a flow diagram illustrating the modification according to the invention of an auto-negotiation process.

FIG. 1 and FIG. 2 illustrate schematically, as indicated previously, a hub connected to an end station and certain operational functions within a hub. The representation is schematic only, because hubs such as Ethernet hubs operating according to a dual standard such as 10 and 100 Megabits per second are well known in the art and the process of auto-negotiation is also well known, being defined in the aforementioned IEEE standard and fully explained in the aforementioned publication.

FIG. 1 illustrates therefore an Ethernet hub 1 having a plurality of ports 2a, 2b . . . 2n, in which port 2a is shown as connected by way of a cable connection 3 to another network station, particularly an end station such as a personal computer 4. The hub 1 may have many connections to other end stations but each of these is an independent point-to-point link.

FIG. 2 illustrates the physical layer associated with a port 2 which is connected to the physical link 3, which may for example by constituted by a pair of transmit lines and a pair of receive lines in a single cable assembly. FIG. 2 illustrates in greatly simplified form some of the functions associated with at least one of the ports. These functions may be exerted by processing means common to a multiplicity of the ports or may be individual to each port. For the sake of simplicity, since FIGS. 1 and 2 represent known practice, the representation in FIG. 2 does not follow the complex though well known architecture and processing protocols associated with Ethernet repeater hubs.

Broadly however, associated with the bidirectional port 2 is a receiving function RX (denoted 10), a signal processing function SP (denoted 11), various other functions not illustrated for convenience, an auto-negotiation state machine (denoted 12) and a transmit function TX (denoted 13) under control of both the signal processing function and the auto-negotiation state machine. The signal processing function is shown with a connection to a bus 15 that may convey data elsewhere in the hub, for example to other ports.

It is now presumed in accordance with known practice that the hub 1 is capable of sending and receiving data from port 2 at any one of a plurality of different rates. For the sake of simplicity it will be presumed that the rates are 10 Megabits per second and 100 Megabits per second and the aforementioned IEEE standard applies. Obviously, if the end station were capable of transmission and reception only at the lower rate, the present invention would not apply. However, it is further presumed that the end station is capable of operation, namely data transmission and reception, at both a lower rate (10 Megabits per second) and a higher rate (100 Megabits per second). The present invention would also be applicable where for example the repeater were capable of operating at three different rates and the end station were capable of operating at at least two or possibly all three of those rates.

It is known as described in the aforementioned application, and according to the IEEE standard, for the station represented by the hub to establish by interrogation and response whether the end station 2 is capable of operating at the higher or two rates and thereafter to cause the exchange of information at the higher rate.

In the ordinary process of auto-negotiation, devices such as the hub 1 and end station 4 exchange link pulses in a defined format as link code words. An auto-negotiation compatible device decodes a base link code word from a fast link pulse burst and examines the contents for the highest common denominator that both devices share. Both devices acknowledge correct receipt of each other's base link code words by responding with fast link pulse bursts containing an acknowledge bit set. After both devices complete acknowledgement, both devices enable the highest common mode negotiated. The process of auto-negotiation is controlled by the state machine 12. The basic operation of this state machine is fully set out in the aforementioned standard and described in the aforementioned publication.

Reference will now be made to FIG. 3 which partly illustrates the relevant stages of auto-negotiation for the particular case of 10BASE-T/100BASE-TX operation. FIG. 3 illustrates the operation of the state machine 12, which will receive information derived from link pulses and code words by way of the receive section 10 and will determine the transmission of link pulses and code words from the transmit section 13.

Stage 31 of FIG. 3 is the stage at which fast link pulse bursts are sent to advertise all the speeds at which the hub is capable. Stage 32 indicates an examination of the link words received from the end station, indicating the capabilities (data rates) pertaining to the end station. Stage 33 indicates the computation of the highest common denominator, namely the highest rate of which both the hub and the end station are capable. Stage 34 is a decision stage indicating either that the highest common denominator is 100 Megabits per second or that it is not. In the latter case, the state machine indicates (arrow 35) that the link will be operated at 10 Megabits per second.

If the highest common denominator is represented by 100 Megabits per second, there needs to be an examination of whether the link is satisfactory, indicated by a true value for a signal termed link_status_[HCD].

As thus far described, stages 31 to 36 represent in simplified form the process of auto-negotiation which is more particularly set out in clause 28 of the aforementioned standard, the state diagrams for the state machine 12 being illustrated by FIGS. 28–14, 28–15 and 28–16 of the aforementioned publication.

At this point it is convenient to mention that for enabling the state machine to perform auto-negotiation according to the standard, five registers (denoted 14 in FIG. 2) dedicated to the auto-negotiation are required. These are known as the MII control register, the MII status register, the auto-negotiation advertisement register, the auto-negotiation link partner ability register and the auto-negotiation expansion register. The MII control register provides a mechanism which enables or disables or restarts the auto-negotiation cycle. The MII status register includes information about all modes of operation supported by the local device's physical layer device (PHY), the status of auto-negotiation and whether the auto-negotiation function is supported by the PHY or not. The auto-negotiation advertisement register contains the advertised ability of the PHY. The auto-negotiation link partner ability register contains the advertised ability of the link partner's PHY. In the present case, the auto-negotiation link partner ability register in the hub will contain the advertised ability of the physical layer device in the end station 4.

The fifth prescribed register is an auto-negotiation expansion register which currently is a 16 bit register of which bit 6.15:5 are revised, bit 6.4 is a parallel detection fault bit, bit 6.3 is a link partner next page able bit, bit 6.2 is a next page able bit, bit 6.1 is a page received bit and bit 6.0 denotes whether the link partner is capable of auto-negotiation.

The page received bit (6.1) is required to be set to logic 1 to indicate that a new link code word has been received and stored in the auto-negotiation link partner ability register. This page received bit is reset to logic 0 on a read of the auto-negotiation expansion register. This provides one example of an indication of the execution of a cycle of auto-negotiation Reverting now to FIG. 3, it will be assumed that the auto-negotiation function in the hub 1 has determined that the link 3 is not completed. Although a link code word will have been received from the end station 4 at the start of negotiation, the absence of an acknowledgement that the link has been established at the negotiated rate will cause the auto-negotiation timer to time out. This is indicated in FIG. 3 by the capital n (negative) to the link ok question. At this point, as will be apparent from a review of the state diagrams already mentioned, the auto-negotiation function will recycle.

The broad idea of the present invention is to monitor the occurrences of 'high' or logical 1 for the page received bit. These may be counted by a simple counter to determine the number of times the state machine executes a loop constituted by stages 31 to 36. The content of the counter may be compared with a threshold. If the threshold is not exceeded in a given time, the link will be taken down and the process of connection restarted, as shown by stage 39. If however the threshold number of occurrences of auto-negotiation is exceeded in the prescribed time, the link may be forced by the state machine to change to the lower speed, in this case 10 Megabits per second. This is shown by stage 40.

Accordingly, the present invention may be implemented in practice by a counter for the occurrences of logic 1 in the page received bit and the insertion of two additional stages 39 and 40 in the state machine prescribed by the aforementioned standard.

It will be plain to those skilled in the art that although FIG. 3 has been described as representing a modification to the state machine in the hub 2 controlling the auto-negotiation process over link 3, it may equally be applied to the corresponding state machine provided at the end station 4.

The present invention may be used in conjunction with the 'smart' auto-sensing process described in the aforementioned applications. This process essentially is constituted by a monitoring for false carriers if the link is operating at a higher of at least two possible rates. This monitoring process fully described in the aforementioned applications, is shown by stage 41. If there are too many false carriers within some predetermined period, then the test shown by stage 42 causes the link to be downgraded to a lower speed. The present invention may easily be used in conjunction with that process, employing the same mechanism (stage 40) to cause a change to an advertised lower speed, requiring again only the monitoring of occurrences of auto-negotiation shown by stage 38 and, if desired, the disabling of the link and a restart as shown by stage 39. It may if desired be possible to omit stage 39 and allow the state machine to revert to stage 31 if the number of executions of auto-negotiation is less than the threshold.

What is claimed is:

1. A method of controlling the rate of transmission of data between a first network station and a second network station connected by way of a transmission link, wherein both the first and second stations are capable of receiving and transmitting data in the form of data packets, at any one of a defined plurality of standard data rates, said data rates comprising at least a higher data rate and a lower data rate, and wherein said first station includes an auto-negotiation state machine for determining whether data is to be transmitted between the stations at the said higher rate or the said lower rate, said auto-negotiation state machine executing an auto-negotiation sequence in accordance with IEEE standard 802.3, clause 28, and including an auto-negotiation expansion register for the indication of a 'page received' bit in accordance with said standard, said method comprising:

monitoring occurrences of said 'page received' bit in said auto-negotiation expansion register to count repetitions of said auto-negotiation sequence; and causing the data rate for said link to be established at the lower rate if the count of repetitions of said auto-negotiation sequence exceeds a threshold.

2. A network station including a port for the transmission and reception of data packets and an auto-negotiation state machine for selecting, in cooperation with a remote station connected to said port by way of a transmission link, which of a plurality of predetermined data rates is to be employed for the transmission of data packets on said link, wherein said unit, under the control of said auto-negotiation state machine, is operable:

(a) to execute at least one auto-negotiation sequence including the exchange of predetermined signals with said remote unit to determine the highest common data rate of which both stations are capable of transmitting on said link;

(b) on reception of an acknowledgement from said remote station to enable transmission on said link at said highest common data rate;

(c) in the absence of timely reception of said acknowledgement, to re-execute the auto-negotiation sequence;

(d) to count repetitions of said auto-negotiation sequence; and (e) when said count exceeds a threshold, to force transmission of data packets on said link at a predetermined rate lower than said highest common data rate.

3. A network station as in claim 2, further comprising an auto-negotiation expansion register for the indication of a 'page received' bit in accordance with IEEE standard 802.3, and wherein said network station counts occurrences of said 'page received' bit to provide a count of repetitions of said auto-negotiation sequence.

* * * * *